(12) United States Patent
Starodoumov et al.

(10) Patent No.: US 7,440,181 B2
(45) Date of Patent: Oct. 21, 2008

(54) DOUBLE-PASS FIBER AMPLIFIER

(75) Inventors: Andrei Starodoumov, Cupertino, CA (US); Paul Crittenden, Woodside, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 11/903,392

(22) Filed: Sep. 21, 2007

(65) Prior Publication Data

US 2008/0030846 A1    Feb. 7, 2008

Related U.S. Application Data

(62) Division of application No. 11/497,825, filed on Aug. 2, 2006, now Pat. No. 7,289,263.

(51) Int. Cl.
*H01S 4/00* (2006.01)
*H04B 10/12* (2006.01)

(52) U.S. Cl. .................................................. 359/347
(58) Field of Classification Search .................. 359/347
See application file for complete search history.

(56) References Cited

U.S. PATENT DOCUMENTS

| 5,303,314 | A | 4/1994 | Duling, III et al. ............ 385/11 |
|---|---|---|---|
| 5,311,603 | A | 5/1994 | Fidric ........................... 385/11 |
| 5,574,739 | A | 11/1996 | Carruthers et al. ............ 372/29 |
| 5,909,306 | A | 6/1999 | Goldberg et al. ............. 359/341 |
| 6,014,249 | A | 1/2000 | Fermann et al. .............. 359/341 |
| 6,049,415 | A | 4/2000 | Grubb et al. .................. 359/341 |
| 6,144,677 | A | 11/2000 | Komine et al. ................... 372/6 |
| 6,282,016 | B1 | 8/2001 | MacCormack et al. ....... 359/341 |
| 6,480,331 | B1 | 11/2002 | Cao ............................ 359/484 |
| 6,603,593 | B2 | 8/2003 | Fidric et al. ................... 359/334 |
| 6,825,974 | B2 | 11/2004 | Kliner et al. ............... 359/341.1 |
| 6,831,779 | B2 | 12/2004 | Caplan ........................ 359/347 |
| 6,954,575 | B2 | 10/2005 | Fermann et al. .............. 385/128 |
| 7,012,739 | B2* | 3/2006 | Lee ............................ 359/326 |
| 7,120,340 | B2 | 10/2006 | Berkey et al. ................ 385/123 |
| 2004/0218255 | A1* | 11/2004 | Krupke ........................ 359/333 |
| 2006/0171426 | A1 | 8/2006 | Starodoumov et al. .......... 372/6 |

OTHER PUBLICATIONS

Cho et al., "A birefringence compensation method for mechanically induced long-period fiber gratings", Optics Communications, vol. 213, pp. 281-284, (2002).*

* cited by examiner

*Primary Examiner*—Eric Bolda
(74) *Attorney, Agent, or Firm*—Stallman & Pollock LLP

(57) ABSTRACT

Several examples of double-pass fiber amplifiers including a polarization maintaining (PM) gain-fiber are disclosed. In each example, input and twice-amplified output are separated by an all-fiber, polarization-maintaining polarization splitter combiner. One example includes a double-pass fiber amplifier which relies on a double pass through a 45 degree fiber based rotator to rotate the polarization of the light.

15 Claims, 6 Drawing Sheets

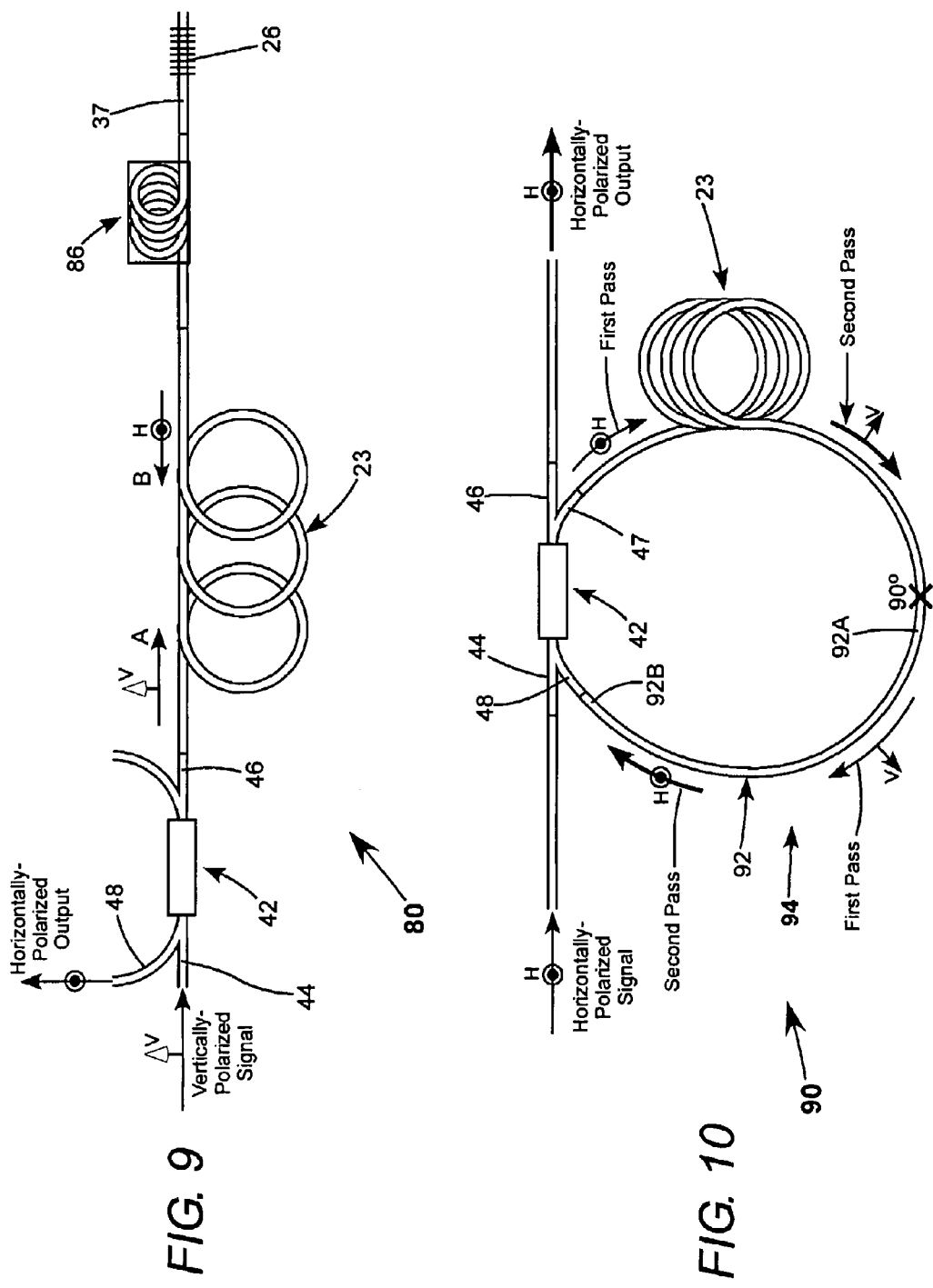

DOUBLE-PASS FIBER AMPLIFIER

PRIORITY CLAIM

This application is a divisional of U.S. patent application Ser. No. 11/497,825, filed Aug. 2, 2006 now U.S. Pat. No. 7,289,263.

TECHNICAL FIELD OF THE INVENTION

The present invention relates in general to optical fiber amplifiers. The invention relates in particular to optical fiber amplifiers in which radiation is amplified on a first pass through a fiber in one direction and amplified again in a second pass through the fiber.

DISCUSSION OF BACKGROUND ART

High-power fiber lasers and fiber amplifiers are good converters of low brightness radiation from diode-lasers to a high brightness single-mode radiation. All-fiber construction, robust monolithic design, and excellent beam quality make fiber lasers a preferred source for many industrial, military, scientific and medical applications. High power fiber laser-amplifiers can be a viable alternative to bulk lasers. The fiber laser geometry provides high overall efficiency, for example a factor of two over bulk laser sources, while minimizing thermal effects.

In CW operation, fiber lasers demonstrate optical-to-optical efficiency approaching 80%. In pulsed operation, however, the efficiency of fiber lasers drops significantly. This is primarily because of significant intracavity loss provided by bulk modulators used to cause pulsed operation. A fiber MOPA master oscillator-power amplifier arrangement is preferable for pulsed operation, because in such an arrangement a highly efficient fiber amplifier determines an overall efficiency of the system.

A typical fiber MOPA system comprises a master oscillator and a multistage amplifier. A master oscillator can be a solid-state laser, a fiber laser, or a semiconductor laser (diode-laser) that provides a light with required parameters such as spectral width, pulse repetition rate, or pulse length. A diode-laser can be directly modulated to provide pulsed operation of the MOPA. This has an advantage of independent control of pulse length and repetition rate. In both solid-state lasers and fiber lasers pulse length changes with repetition rate. The low output power from a diode laser (<1 W typically) has to be amplified to multi-kilowatt level. Such powers require multiple amplification stages. Rare-earth-ion-doped fiber amplifiers can provide high gain (more than 30 decibels (dB)) for a small signal. Such strong gain may result in a self-excitation of the amplifiers caused by back-reflection from fiber ends or optical elements placed after each stage, and by Rayleigh back-scattering. The strong gain may also result in a cross-talk between amplifier stages, leading to instability in the fiber MOPA. Good isolation, for example, with back-reflections suppressed by 50 dB is often required for a stable amplifier operation.

A multistage fiber amplifier has been used to boost signals from pulsed sources with between about 1 and 1000 milliwatts (mW) of peak power to a multi-kilowatt level. Average powers of such pulsed sources are typically in a range between about 1 microwatt ($\mu$W) and 10 mW. Saturation power for a standard Yb-doped amplifier gain-fiber, having core and cladding diameters of respectively 6 micrometers ($\mu$m) and 125 $\mu$m is on the order of 20 mW at a wavelength of 1064 nanometers (nm). Because of this, in many cases, low input signal will not saturate the gain of an amplifier fiber (amplifier stage) and can give rise to amplified spontaneous emission (ASE). This presents a problem, as ASE from one amplifier can be amplified in a subsequent amplifier stage, taking part of stored energy and causing instability in the MOPA. Un-saturated high gain, for example, about 30 dB may cause sporadic pulsed lasing in the MOPA, with the sporadic pulses lasing having a peak power exceeding a threshold of optical damage for optical components of the MOPA such as isolators, polarizers, and the master oscillator.

Another problem for a multistage, high-gain amplifier arrangement is a back-reflected signal. Here, residual reflection from fiber ends, for example, from an angle-cleaved fiber tip, may provide a back-reflected signal of between about 30 dB and 40 dB less than the output amplified signal. Anti-reflection coated optical surfaces can also provide a reflected signal at about the same level. A back-reflected signal will be amplified on its way back in a high power amplifier and can achieve rather high amplitude comparable to the original signal. Even after being attenuated by between about 25 dB and 35 dB by an inter-stage isolator, this back-reflected signal is again amplified in the previous stage of the amplifier. Eventually, such a high power back-reflected signal may reach low power optical isolators and the master oscillator at the beginning of the MOPA and damage these components. Because of this, it is important to keep each amplification stage at a low gain, or in other words, operate each amplification stage in a deep saturation regime where population inversion in the gain-fiber is relatively low.

Reduction in gain for each amplification stage can be achieved by increasing the input signal power to a level close to a saturation power for each amplifier stage. In practice, it is difficult to increase an input signal power because this often requires an additional amplification stage that in turn increases ASE and increases cost of the MOPA.

Another method of saturating an amplifier stage is to use a double-pass arrangement in that stage. FIG. 1 schematically illustrates a prior-art double-pass amplifier stage 10 developed for erbium (Er)-doped fiber amplifiers used in telecommunication applications. In arrangement of FIG. 1 an optical signal, propagating along a fiber 14, enters a port 16 of an optical circulator 12. The signal exits the circulator via port 18 thereof and propagates through diode-laser pumped, Er-doped amplifier fiber (gain-fiber) 22. Pump-light from diode-lasers (not shown) is delivered to fiber 22 via fibers 24 fused into the cladding of fiber 22. The signal is amplified on a first pass (forward pass) through fiber 22 and is reflected back by a fiber Bragg grating (FBG) 26. The FBG has a sufficiently narrow band width that a significant portion of ASE generated in the fiber is transmitted by the FBG out of the amplifier stage. The back-reflected signal is amplified again in fiber 22 in a reverse pass therethrough. The back-reflected signal enters circulator 12 via port 18 thereof and exits the circulator via port 28 thereof. In this double-pass arrangement the signal will be amplified to a near-saturation level in the first pass. Because of this, the back reflected signal will experience depleted gain and ASE will be reduced. The total-gain for the double pass is still greater however than that of a comparable single-pass amplifier, while residual gain for the back-reflected signal is significantly less, for example, between about 10 dB and 15 dB less. A detailed description of two-stage amplifiers using the arrangement of FIG. 1 is provided in US Published Patent Application 20060082867.

FIG. 2 schematically illustrates another prior-art arrangement 30 of a double-pass fiber amplifier stage. In arrangement 30, a plane-polarized signal enters a bulk polarizing beam-splitter 32 having an internal reflecting (polarization-splitting) surface 34 splitter. The polarized signal is designated, here, as being P-polarized, i.e., polarized with the electric field in the plane of incidence of surface 34, here, in the plane of the drawing. In this polarization orientation, the signal is transmitted through surface 34 and through the polarizing beam splitter. The transmitted signal is focused by a lens 36 into a single-mode, polarization-maintaining (PM) gain-fiber 23. The signal is amplified in a forward pass through the fiber. A Faraday polarization-rotating mirror 38 coupled to fiber 23 rotates the polarization plane of the amplified signal by 90° and reflects the amplified signal back along the gain-fiber, wherein the signal is further amplified. The twice-amplified signal is now S-polarized with respect to surface 34 of the polarizing beamsplitter, and is reflected by surface 34 out of the polarizing beamsplitter in a direction perpendicular to the input direction. The polarizing beamsplitter, which typically has a cemented interface for surface 34, is vulnerable to damage by the twice-amplified radiation In any double-pass amplifier arrangement, the use of a circulator, an isolator, or a Faraday rotator limits the output power of the amplifier. Typical fiber "pigtailed" circulators or isolators include micro-optical bulk elements. Such circulators have an operating average power limit between about 300 mW and 500 mW at a wavelength of 1064 nm, and a peak power limit less than about 400 W for nanosecond pulses. Accordingly, a double pass amplifier arrangement including one or more of these components is useful only for the first low-power stages of a multi-stage amplifier. There are some commercially available fiber pigtailed isolators that tolerate higher average power, for example about 5 W, and peak power for example about 1 kilowatt kW. However, these are relatively very expensive and bulky. There is a need for a double-pass fiber amplifier arrangement with an output average power of about 300 mW or greater that does not have any bulk components at the output end thereof and preferably does not have any bulk components at all. This of course applies only to components of the amplifier proper. Some bulk components may be inevitable in arrangements for coupling pump light from a diode-laser or diode-lasers into the amplifier gain-fiber for emerging the gain fiber.

SUMMARY OF THE INVENTION

In one aspect apparatus in accordance with the present invention comprises an optical fiber amplifier including an all-fiber polarization splitter-combiner, a polarization-rotating arrangement, and a polarization maintaining gain-fiber. The amplifier is arranged such that light (radiation) plane-polarized in a first polarization-orientation enters the amplifier via the polarization splitter-combiner and makes a first pass through the gain fiber in the first polarization-orientation. The light is polarization rotated by the polarization rotating arrangement into a second polarization-orientation perpendicular to the first polarization-orientation, makes a second pass through the gain fiber in a second polarization-orientation, and exits the amplifier via the polarization splitter-combiner in the second polarization-orientation.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 9 schematically illustrates a seventh preferred embodiment of a double-pass fiber amplifier in accordance with the present invention similar to the embodiment of FIG. 3, but wherein the Faraday polarization rotator and the FBG are replaced by FBG written into a passive PM fiber including a stressed-fiber polarization rotator and spliced to the PM gain-fiber.

FIG. 10 schematically illustrates an eighth preferred embodiment of a double-pass fiber amplifier in accordance with the present invention including a two-fiber polarization-sensitive coupler-splitter having ends of one fiber thereof coupled to a fiber loop including a PM gain-fiber spliced to a passive PM fiber by a 90 cross-splice.

DETAILED DESCRIPTION OF THE INVENTION

In the background section presented above and the detailed description present below reference is made to polarization-maintaining (PM) fibers. Before proceeding with the detailed description, a brief description of a PM fiber and a brief review of PM fiber principles is next presented.

In a PM fiber, the polarization planes of linearly polarized light waves launched into the optical fiber are maintained during propagation, with little or no cross-coupling of optical power between the orthogonally opposed polarization modes. Each polarization mode propagates at its own speed, and the speed difference of two polarization modes depends on the birefringence of the optical fiber. Typical fiber birefringence is in a range of $n_x-n_y$ between about $1\times10^{-4}$ and $8\times10^{-4}$, where $n_x$, $n_y$ are effective refractive indices for light polarized in orthogonal, transverse axes. These axes are often referred to as the, "slow" and "fast" axes. Light polarized along the "slow-axis" propagates slower than light polarized along the "fast-axis". In a PM gain-fiber the core material of the fiber is doped, usually with rare earth ions. In a passive PM fiber the core material is undoped. Several configurations of PM fiber are known in the art and are commercially available from various sources. Certain configurations have round cores. Others have non-round, for example, elliptical cores. A detailed description of several such configurations is presented in U.S. patent application Ser. No. 11/049,412, filed Feb. 2, 2005, the complete disclosure of which is hereby incorporated by reference.

In all embodiments of the present invention described below, a device is included that is often referred to as a polarization-maintaining polarization splitter-combiner (hereinafter, simply PSC). Such a PSC is formed from two PM-fibers fused and tapered such that claddings thereof fused together over a predetermined length. As such, a fiber polarization splitter-combiner can be designated an "all-fiber" component, i.e., not a bulk component. Free ends of the fused and tapered PM fibers provide input and output ports of the PSC. The tapering and fusing of the fibers are arranged such that coupling from one fiber to another is polarization dependent.

By way of example, the fusing and tapering can be arranged according to the PM fiber configuration such that if radiation is plane-polarized with the polarization plane thereof aligned with a particular polarization axis, say the fast axis, of the fiber along which the radiation enters the PSC, the radiation will exit the PSC along that fiber, and little or none of the radiation will be coupled into the other fiber of the PSC. Conversely, if radiation is plane-polarized with the polarization plane thereof aligned at 90° to fast axis of the fiber along which the radiation enters the PSC, all or most of the radiation will be coupled into the other fiber of the PSC and the radiation will exit the PSC along that fiber.

Figure 3:
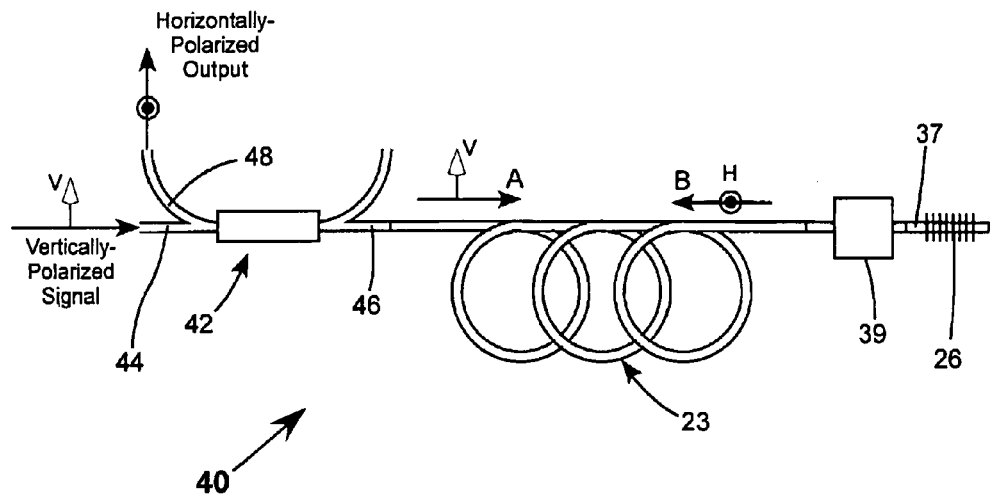
FIG. 3 schematically illustrates a first preferred embodiment of a double-pass fiber amplifier in accordance with the present invention including a two-fiber polarization-sensitive coupler-splitter, a PM gain-fiber, a Faraday polarization rotator and fiber Bragg grating (FBG).

Referring again to the drawings, wherein like components are designated by like reference numerals, FIG. 3 schematically illustrates a first preferred embodiment 40 of a double-pass fiber amplifier stage (amplifier) in accordance with the present invention. In amplifier 40 plane-polarized signal enters port 44 of a PSC 42. In FIG. 3 the plane-polarized signal is arbitrarily designated as being vertically-polarized, here, with the electric field in the plane of the drawing as indicated by arrow V. In this polarization-orientation the signal enters PSC 42 via port 44 thereof is transmitted through the PSC and exits from port 46 thereof (enters and exits along the same fiber of the PSC) and propagates through a polarization-maintaining gain-fiber 23, the appropriate polarization axis of which is co-aligned with that of output port 46 of polarization coupler-splitter 42.

The signal makes a forward pass through the gain-fiber as indicated by arrow A with the polarization maintained. The signal is amplified on the forward pass through the gain-fiber. Here, it should be noted that optical pumping arrangements for PM gain-fiber 23 are not shown in FIG. 3, and other drawings referred to herein below, for convenience of illustration. Pumping arrangements may include, inter alia, core-pumping via a wavelength division multiplexing (WDM), coupler and cladding pumping via side couplers, pump-light combiners or the like. Such arrangements are well known in the art and a description thereof is not necessary for understanding principles of the present invention. The forward-pass amplified signal encounters a Faraday rotator 39 arranged to rotate the polarization plane of the amplified signal by 45°. Such a Faraday rotator is commercially available from a number of sources, for example from Novaware Technologies Inc. of Redwood City, Calif. The Faraday rotator is pigtailed to the gain-fiber and is also pigtailed to a short length 37 of passive PM fiber in which a FBG 26 is written.

FBG 26 reflects the amplified signal back through Faraday rotator, wherein the polarization orientation of the amplified signal undergoes a further 45°-rotation. Following this further rotation the amplified signal exits the Faraday rotator horizontally polarized and makes a reverse pass through gain-fiber 23 as indicated by arrow B. The polarization orientation of the reverse-pass signal is designated by arrowhead H. The double pass amplified signal, with the horizontal polarization thereof maintained, enters PSC 42 via port 46 thereof and is coupled out of the PSC via port 48 thereof, i.e., the radiation enters the PSC along the original entry fiber and is coupled into the other fiber.

Figure 1:
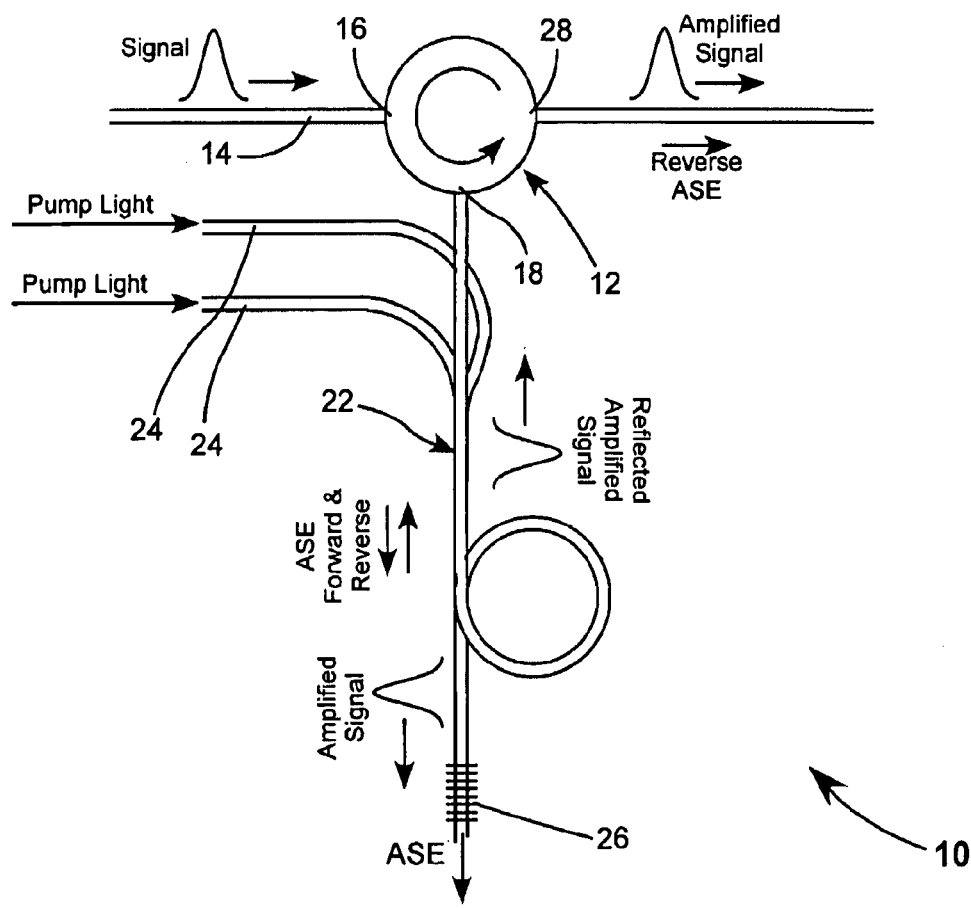
FIG. 1 schematically illustrates one prior-art double-pass fiber amplifier including an input fiber coupled to the first port of a three-port circulator, a gain-fiber coupled to the second port of the three-port circulator a fiber Bragg mirror written into the end of the gain-fiber.
Figure 2:
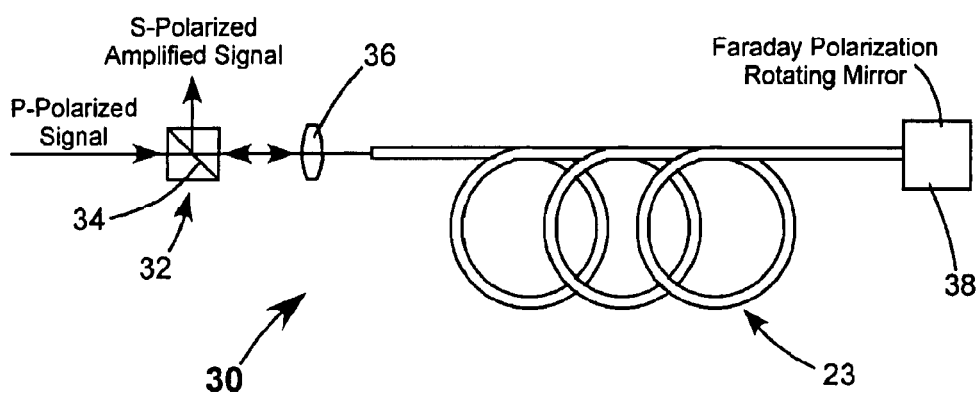
FIG. 2 schematically illustrates another prior-art double-pass fiber amplifier including a polarizing beamsplitter, a polarization maintaining (PM) gain-fiber, and a Faraday polarization rotating mirror.
Figure 4:
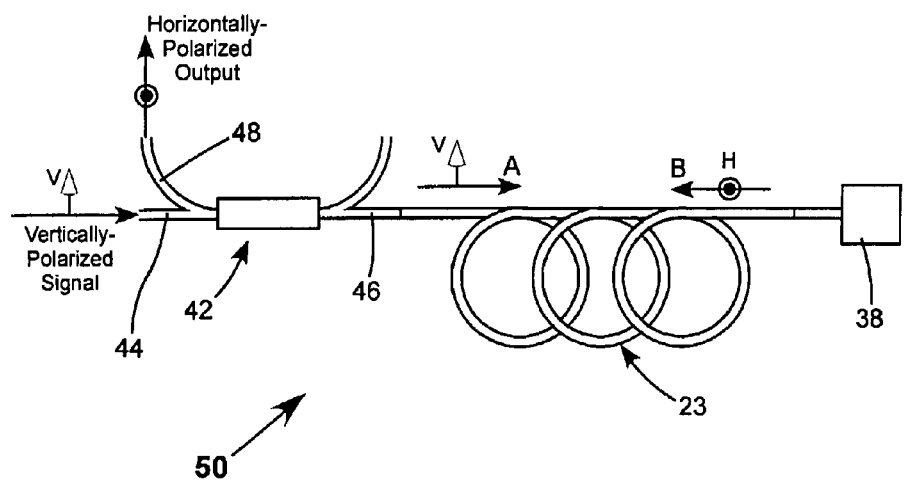
FIG. 4 schematically illustrates a second preferred embodiment of a double-pass fiber amplifier in accordance with the present invention similar to the embodiment of FIG. 3, but wherein the Faraday polarization rotator and the FBG are replaced by a Faraday polarization rotating mirror.

FIG. 4 schematically illustrates a second embodiment 50 of a double-pass fiber amplifier in accordance with the present invention. Amplifier 50 is similar to amplifier 40 of FIG. 3 with an exception that the combination of Faraday rotator 39 and FBG 26 of amplifier 40 is replaced in amplifier 50 by a Faraday polarization-rotating mirror 38 arranged to rotate the polarization plane of the forward-pass amplified radiation by 90°. Faraday rotating mirrors are commercially available from a number of sources, for example, from OFR Inc. of Caldwell, N.J. Amplifier 40 has an advantage over amplifier 50 inasmuch as the FBG can be configured to transmit ASE generated on the forward pass out of the amplifier, as described above with reference to prior-art double-pass amplifier 10 of FIG. 1.

Figure 5:
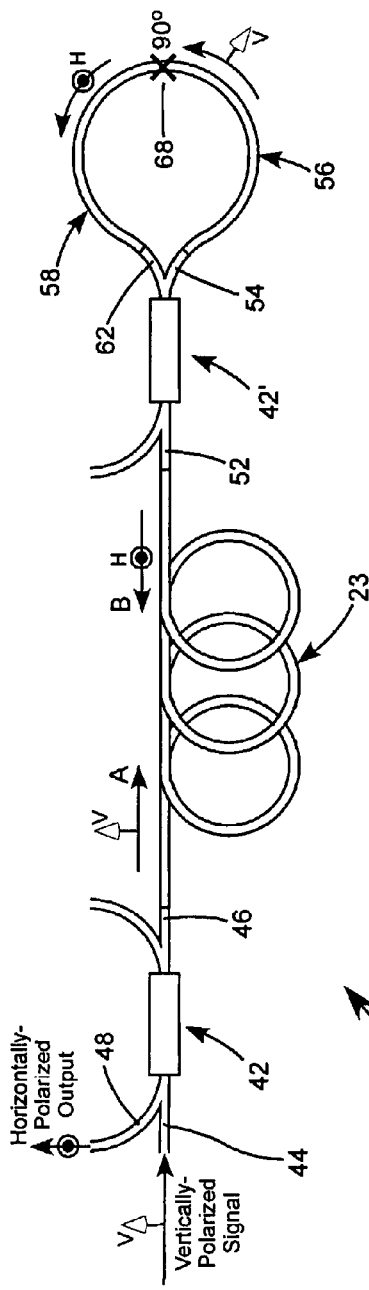
FIG. 5 schematically illustrates a third preferred embodiment of a double-pass fiber amplifier in accordance with the present invention similar to the embodiment of FIG. 3, but wherein the Faraday polarization rotator and the FBG are replaced by a second two-fiber polarization splitter-combiner cooperative with a cross-spliced passive PM fiber loop mirror.

FIG. 5 schematically illustrates a third embodiment 60 of a double-pass fiber amplifier in accordance with the present invention that does not include any bulk components. Amplifier 60 also includes a PSC 42. In FIG. 5, the plane-polarized signal is again arbitrarily designated as being vertically-polarized, here, with the electric field in the plane of the drawing as indicated by arrow V. Again, in this polarization-orientation the signal is transmitted through PSC 42 via port 44 thereof and exits from port 46 thereof (enters and exits along the same fiber of the PSC) and propagates through a PM gain-fiber 23 as indicated by arrow A, the appropriate polarization axis of which is co-aligned with that of output port 46 of polarization coupler-splitter 42. Once-amplified radiation, still vertically polarized, is coupled into port 52 of another PSC 42' configured similarly to PSC 42. The radiation exits PSC 42' via port 54 thereof and is coupled, still vertically polarized, into a passive PM fiber 56. The radiation reaches a 90° cross-splice 68 between PM fiber 56 and another PM fiber 58. The term 90° cross-splice, here, means that like (fast or slow) polarization axes of the fibers are aligned at 90° to each other. Such a cross-splice rotates the plane of rotation of radiation traversing the cross-splice by 90°. Accordingly, radiation in PM fiber 58 is now horizontally polarized. This horizontally-polarized radiation enters PSC 42' via port 62 thereof and is coupled by the PSC into the entry fiber of the PSC, such that the radiation exits via this fiber, i.e., via port 52 of the PSC. The combination of PSC 42' and cross-spliced passive PM fibers 56 and 58 can be described as a polarization-rotating, fiber-loop mirror. The horizontally-polarized radiation from this fiber-loop mirror traverses PM gain-fiber 23, as indicated by arrow B, and is further amplified. The further-amplified (twice-amplified) radiation, still horizontally-polarized, enters PSC 42 via port 46 thereof and, being horizontally polarized, is coupled out of the PSC via port 48 thereof.

Figure 6:
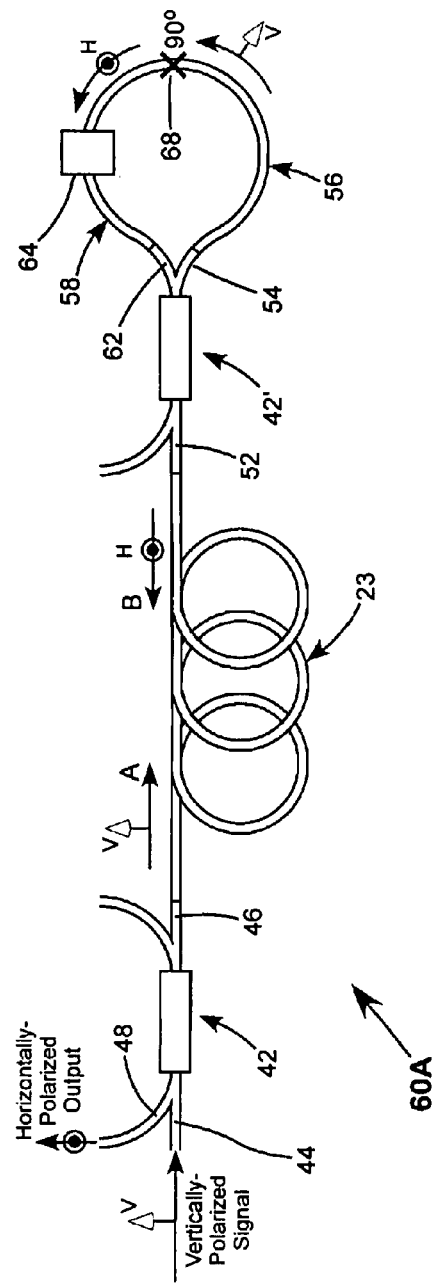
FIG. 6 schematically illustrates a fourth preferred embodiment of a double-pass fiber amplifier in accordance with the present invention similar to the embodiment of FIG. 5, but further including an ASE rejecting spectral filer in the cross-spliced passive PM fiber loop mirror.

FIG. 6 schematically illustrates a fourth embodiment 60A of a double-pass fiber amplifier in accordance with the present invention. Amplifier 60A is similar to amplifier 60 of FIG. 5, but further includes a fiber-coupled, spectral filter 64 located in the fiber-loop mirror formed by PSC 42' and cross-spliced fibers 56 and 58. Filter 64 has a bandwidth selected to preferentially transmit the amplified signal while substantially rejecting ASE. By way of example, for amplified 1064 nm-radiation filter 64 preferably has a FWHM bandwidth of about 1.0 nm or less. Such filters are commercially available with bandwidths as low as 0.3 nr (dependent on peak transmission wavelength) from a number of sources, for example, from OZ Optics Ltd, of Ottawa, Canada.

Figure 7:
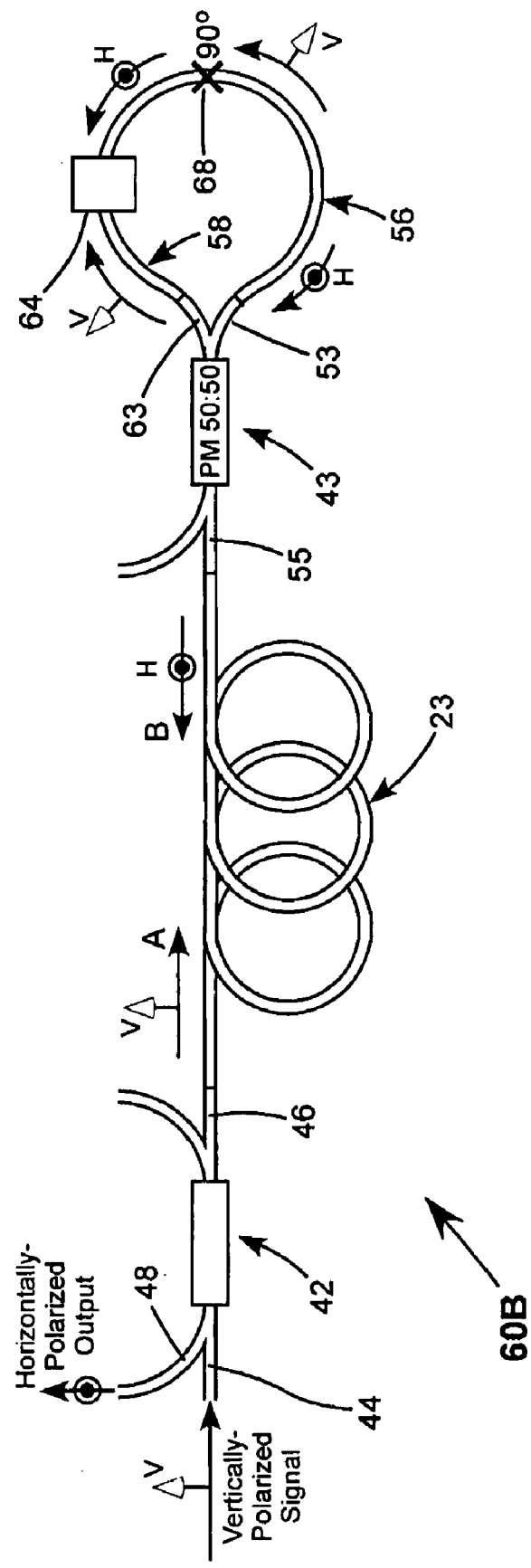
FIG. 7 schematically illustrates a fifth preferred embodiment of a double-pass fiber amplifier in accordance with the present invention similar to the embodiment of FIG. 6, but wherein the second polarization splitter-combiner is replaced by a polarization-maintaining 50:50 coupler.

FIG. 7 schematically illustrates a fifth embodiment 60B of a double-pass fiber amplifier in accordance with the present invention. Amplifier 60B is similar to amplifier 60A of FIG. 6 with an exception PSC 42' is replaced by a 50:50 PM coupler 43. In this case, once-amplified, vertically-polarized radiation entering the 50:50 PM coupler is split into two portions. These portions exit the coupler via ports 53 and 63 thereof. The two portions traverse the loop mirror in opposite directions and are polarization-rotated at cross-splice 68 between fiber 56 and 58. The portions recombine in coupler 43 wherein interference effects provide that the combined portions exit the coupler via port 55 thereof. It should be noted, here that while a 50:50 split ratio for coupler 43 is preferred this should not be considered limiting. Other ratios may be used. However, these ratios may not be as effective as a 50:50 ratio.

Figure 8:
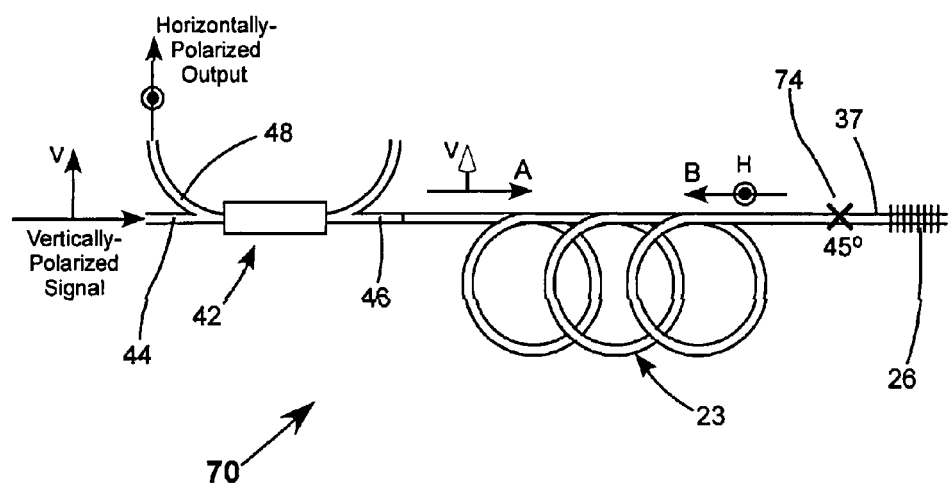
FIG. 8 schematically illustrates a sixth preferred embodiment of a double-pass fiber amplifier in accordance with the present invention similar to the embodiment of FIG. 3, but wherein the Faraday polarization rotator and the FBG are replaced by FBG written into a passive PM fiber coupled to the PM gain-fiber by a 45° cross-splice.

FIG. 8 schematically illustrates a sixth embodiment 70 of a double-pass fiber amplifier in accordance with the present invention. Amplifier 70 is similar to amplifier 40 of FIG. 3 with an exception that bulk Faraday polarization rotator 39 of amplifier 40 is omitted, and the 45° polarization-rotation function of the bulk component is provided by a 45° cross-splice 74 between passive PM fiber 37 in which FBG 26 is written and PM gain-fiber 23. Alternatively, the 45° cross-splice could be provided between fiber 37 and another length of passive PM fiber conventionally spliced to the gain-fiber with like polarization axes of the fibers precisely co-aligned.

FIG. 9 schematically illustrates a seventh embodiment 80 of a double-pass fiber amplifier in accordance with the present invention. Amplifier 80 is similar to amplifier 70 of FIG. 8 with an exception that the polarization rotation function of 45° cross-splice 74 of amplifier 70 is supplied by a 45°, fiber polarization-rotator 86 conventionally spliced between PM gain-fiber 23 and PM fiber 37 in which FBG 26 is written. PM fiber 37 may be a PM fiber or a conventional fiber. The 45° fiber polarization-rotator comprises a length of fiber that is tightly bent, tightly looped, or twisted to introduce stress into the fiber. This length of fiber is preferably not a length of PM fiber. Polarization rotation is introduced by birefringence resulting from the stress. Such rotators are commercially available, for example, from OZ Optics Ltd, of Ontario, Canada.

In all of the above-described embodiments of the inventive double-pass amplifier, radiation is amplified on a first pass through a PM gain-fiber in one direction then further amplified by a second pass through the gain-fiber in the opposite direction. FIG. 10 schematically illustrates an eighth embodiment 90 of a double-pass fiber amplifier in accordance with the present invention in which the two amplifying passes occur in the gain-fiber in the same direction, albeit, with polarization orientations in the two passes orthogonally opposed.

As in all other above-described inventive amplifiers, amplifier 90 includes a PSC 42 as the component used for separating input and output radiation by polarization selection. Ports 44 and 46 are ends of one of a first of two fused-together PM fibers of the PSC and ports 47 and 48 are ends of the second of the fused-together PM fibers of the PSC. Port 47 in other-above described embodiments is redundant. In amplifier 90, PM gain-fiber 23 is conventionally spliced to port 47 of the PSC, i.e., with like polarization-axes of the gain-fiber and the PSC fiber co-aligned. Gain-fiber 23 is spliced to one end 92A of a PM fiber 92 with like axes cross-spliced at 90° to each other to introduce a 90° polarization-rotation. PM fiber 92 may be an active (gain) fiber or a passive PM fiber. Opposite end 92B of fiber 92 is conventionally spliced to port 48 of the PSC, i.e., to the ends of the second of the two fused-together fibers of the PSC. This forms a fiber-loop 94 including the second fiber of the PSC, gain-fiber 23 and passive PM fiber 92.

An input signal to be amplified is delivered, horizontally polarized, to PSC 42. This is the polarization orientation for which coupling occurs in the PSC. Accordingly, the signal is coupled out of the PSC 42, via port 47 thereof, into gain-fiber 23 and makes a first pass therethrough, horizontally polarized as indicated in FIG. 10 by a single-weight arrow. After traversing the 90° cross-splice between the PM gain-fiber and passive PM fiber 92, the (once-amplified) radiation is now vertically polarized. This is the polarization orientation for which no coupling between fibers occurs in the PSC. As a result of this, the once-amplified, vertically-polarized radiation stays in loop 94 and makes a second pass through PM gain-fiber 23, as indicated by the double-weight arrow. After traversing the 90° cross-splice between the PM gain-fiber and passive PM fiber 92, the twice-amplified radiation is now horizontally polarized. This is the polarization orientation for which coupling between fibers occurs in the PSC. Accordingly the twice amplified radiation is coupled into the first fiber of PSC 42 via port 48 thereof, and exits the PSC via port 46 thereof as output radiation to be used in an application, or passed to another amplification stage.

Those skilled in the art will recognize that in the above referenced drawings certain fibers represented as being single fibers may be made up from two or more fibers conventionally spliced together for one reason or another. Suggested conventional splices are designated simply by a line transverse to the longitudinal axis of the fibers, or ports of components, concerned. Only splices that have an active function in the inventive amplifiers, such as the 90° and 45° cross-splices, are numerically, or textually designated.

The above-described inventive double-pass amplifiers may be classified in two groups. One group, exemplified by amplifiers 60, 70, 80, and 90, is a group of "all-fiber" amplifiers that do not include any bulk components. Amplifiers in the other group exemplified by amplifiers 40, 50, 60A, and 60B each include a bulk component such as a Faraday rotator, a Faraday rotating mirror or a spectral filter. In each case, however, the bulk component is located in a position in the amplifier where the component is subject only to radiation amplified on the first pass through the amplifier, thereby avoiding possible destruction of the component by twice-amplified radiation. In both groups, input and twice-amplified output are separated by an all-fiber, polarization-selective component (the PSC 42). Those skilled in the art may devise, from the drawings and from the description presented above, without departing from the spirit and scope of the present invention, other embodiments of the inventive amplifier wherein a feature of one embodiment is added to another embodiment or replaces a feature of another embodiment.

In summary, the present invention is described above in terms of eight preferred embodiments thereof. The invention is not limited, however, to the embodiments described and depicted. Rather, the invention is limited only by the claims appended hereto.

What is claimed is:

1. An optical apparatus, comprising:
an optical fiber amplifier including an all-fiber polarization splitter-combiner, a polarization-rotating arrangement, and a gain-fiber, the amplifier being arranged such that light plane-polarized in a first polarization-orientation enters the amplifier via the polarization splitter-combiner, makes a first pass through the gain fiber in the first polarization-orientation, is polarization rotated by the polarization-rotating arrangement into a second polarization-orientation perpendicular to the first polarization-orientation, makes a second pass through the gain fiber in a second polarization-orientation, and exits the amplifier via the polarization splitter-combiner in the second polarization-orientation and wherein the polarization-rotating arrangement is provided by a 45 degree fiber-based rotator arranged so that the light will traverse the 45 degree fiber rotator twice prior to reentering the gain fiber.

2. An apparatus as recited in claim 1, wherein said polarization rotating arrangement includes a 45 degree cross splice located in a passive polarization maintaining fiber.

3. An apparatus as recited in claim 2, further wherein said polarization-rotating arrangement further includes a reflector for causing the light to traverse the 45 degree cross splice twice in opposite directions prior to reentering the gain fiber.

4. An apparatus as recited in claim 3, wherein said reflector is a fiber Bragg grating.

5. An apparatus as recited in claim 3, wherein the first and second passes through the gain fiber are in opposite directions.

6. An apparatus as recited in claim 1, wherein said polarization-rotating arrangement includes a stressed fiber.

7. An apparatus as recited in claim 6, further wherein said polarization-rotating arrangement further includes a reflector for causing the light to traverse the stressed fiber twice in opposite directions prior to reentering the gain fiber.

8. An apparatus as recited in claim 7, wherein said reflector is a fiber Bragg grating.

9. An apparatus as recited in claim 7, wherein the first and second passes through the gain fiber are in opposite directions.

10. An apparatus as recited in claim 1, wherein the first and second passes through the gain fiber are in opposite directions.

11. A method of amplifying light comprising the steps of:
a) injecting light plane-polarized in a first polarization-orientation into an all-fiber polarization splitter-combiner;
b) coupling light exiting the splitter-combiner into a gain fiber where the light is amplified during a first pass therethrough;
c) rotating the polarization of the light by passing the light through a 45 degree fiber-based rotator arranged so that the light will traverse the 45 degree fiber rotator twice in opposite directions;
d) coupling the light back into the gain fiber where the light is amplified during a second pass therethrough;
e) coupling the twice amplified light into the splitter-combiner; and
f) coupling the twice amplified light out of the splitter-combiner.

12. A method as recited in claim 11, wherein the first and second passes of the light through the gain fiber are in opposite directions.

13. Method as recited in claim 12, wherein step (d) is performed by coupling the light back into the end from which the light exited the gain fiber on the first pass therethrough.

14. A method as recited in claim 11, wherein the 45 degree fiber based rotator is a 45 degree cross splice located in a passive polarization maintaining fiber.

15. A method as recited in claim 11, wherein the 45 degree fiber based rotator is a stressed fiber.

* * * * *